(12) United States Patent
Miyabe

(10) Patent No.: US 7,024,113 B2
(45) Date of Patent: Apr. 4, 2006

(54) PATH ROUTE MODIFICATION METHOD AND SWITCHING SYSTEM USING THE SAME

(75) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 10/033,213

(22) Filed: Dec. 28, 2001

(65) Prior Publication Data

US 2002/0186689 A1    Dec. 12, 2002

(30) Foreign Application Priority Data

May 18, 2001    (JP)    ............................. 2001-149674

(51) Int. Cl.
*H04B 10/00*    (2006.01)

(52) U.S. Cl. .......................... 398/51; 398/57; 370/392; 370/400

(58) Field of Classification Search ................... 398/48, 398/49, 50, 51, 55, 56, 57, 392; 370/351, 370/392, 400, 401

See application file for complete search history.

(56) References Cited

U.S. PATENT DOCUMENTS 6,671,256 B1 * 12/2003 Xiong et al. ................. 370/230
6,771,645 B1 *  8/2004 Sasagawa et al. .......... 370/392

* cited by examiner

*Primary Examiner*—Christina Y. Leung
(74) *Attorney, Agent, or Firm*—Katten Muchin Rosenman LLP

(57) ABSTRACT

A path route modification method and a switching system using the method enable to prevent duplicated label setting in the route modification performed in a network. For switching system, a packet switching system disclosed includes a table for mapping either an input label value or a set of input label value and input port to an output port and an output label, wherein a state variable is set for either the input label value or the set of input label value and input port mapped in the table to represent either of the three states of 'not reserved', 'reserved', and 'double reserved'; and a packet switch for packet-switching packet data according to the information mapped in the table.

4 Claims, 28 Drawing Sheets

FIG. 2A

LSR1 MANAGEMENT TABLE

| INPUT INFORMATION | LSPID | OUTPUT PORT | OUTPUT LABEL |
|---|---|---|---|
| INFORMATION OF LSR1 TO LSR5 | 1 | 1 | L21 |
| ... | ... | ... | ... |

FIG. 2B

LSR2 MANAGEMENT TABLE

| INPUT PORT | INPUT LABEL | RESERVE | LSPID | OUTPUT PORT | OUTPUT LABEL |
|---|---|---|---|---|---|
| 1 | L21 | O | 1 | 1 | L31 |
| ... | ... | ... | ... | ... | ... |

FIG. 2C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | O | 1 | 1 | L41 |
| ... | ... | ... | ... | ... | ... |

FIG. 2D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | O | 1 | 1 | L51 |
| ... | ... | ... | ... | ... | ... |

FIG. 2E

LSR5 MANAGEMENT TABLE

| INPUT PORT | INPUT LABEL | RESERVE | LSPID | NOTE |
|---|---|---|---|---|
| 2 | L51 | O | 1 | TO UPPER LAYER AFTER DELETING LABEL |
| ... | ... | ... | ... | ... |

FIG. 3A

LSR1 MANAGEMENT TABLE

| INPUT INFORMATION | LSPID | OUTPUT PORT | OUTPUT LABEL |
|---|---|---|---|
| INFORMATION OF LSR1 TO LSR5 | 1 | 1 | L21 |
|  | 1 | 1 | — |
| ... | ... | ... | ... |

FIG. 3B

LSR2 MANAGEMENT TABLE

| INPUT PORT | INPUT LABEL | RESERVE | LSPID | OUTPUT PORT | OUTPUT LABEL |
|---|---|---|---|---|---|
| 2 | L21 | O | 1 | 1 | L31 |
| 2 | L22 | O | 1 | 3 | — |
| ... | ... | ... | ... | ... | ... |

FIG. 3C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | O | 1 | 1 | L41 |
| ... | ... | ... | ... | ... | ... |

FIG. 3D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | O | 1 | 1 | L51 |
| 3 | L42 | O | 1 | 1 | — |
| ... | ... | ... | ... | ... | ... |

FIG. 3E

LSR5 MANAGEMENT TABLE

| INPUT PORT | INPUT LABEL | RESERVE | LSPID | NOTE |
|---|---|---|---|---|
| 2 | L51 | O | 1 | TO UPPER LAYER AFTER DELETING LABEL |
| 2 | L52 | O | 1 | TO UPPER LAYER AFTER DELETING LABEL |
| ... | ... | ... | ... | ... |

FIG. 4A

LSR1 MANAGEMENT TABLE

| INPUT INFORMATION | LSPID | OUTPUT PORT | OUTPUT LABEL |
|---|---|---|---|
| | 1 | 1 | L21 |
| INFORMATION OF LSR1 TO LSR5 | 1 | 1 | L22 |
| ... | ... | ... | ... |

FIG. 4B

LSR2 MANAGEMENT TABLE

| INPUT PORT | INPUT LABEL | RESERVE | LSPID | OUTPUT PORT | OUTPUT LABEL |
|---|---|---|---|---|---|
| 2 | L21 | O | 1 | 1 | L31 |
| 2 | L22 | O | 1 | 3 | L42 |
| ... | ... | | ... | ... | ... |

FIG. 4C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | O | 1 | 1 | L41 |
| ... | ... | | ... | ... | ... |

FIG. 4D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | O | 1 | 1 | L51 |
| 3 | L42 | O | 1 | 1 | L52 |
| ... | ... | | ... | ... | ... |

FIG. 4E

LSR5 MANAGEMENT TABLE

| INPUT PORT | INPUT LABEL | RESERVE | LSPID | NOTE |
|---|---|---|---|---|
| 2 | L51 | O | 1 | TO UPPER LAYER AFTER DELETING LABEL |
| 2 | L52 | O | 1 | TO UPPER LAYER AFTER DELETING LABEL |
| ... | ... | | ... | ... |

FIG. 5A

LSR1 MANAGEMENT TABLE

| INPUT INFORMATION | LSPID | OUTPUT PORT | OUTPUT LABEL |
|---|---|---|---|
| INFORMATION OF LSR1 TO LSR5 | – | – | – |
| | 1 | 1 | L22 |
| ... | ... | ... | ... |

FIG. 5B

LSR2 MANAGEMENT TABLE

| INPUT PORT | INPUT LABEL | RESERVE | LSPID | OUTPUT PORT | OUTPUT LABEL |
|---|---|---|---|---|---|
| 2 | L21 | × | – | – | – |
| 2 | L22 | ○ | 1 | 3 | L42 |
| ... | ... | ... | ... | ... | ... |

FIG. 5C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | × | – | – | – |
| ... | ... | ... | ... | ... | ... |

FIG. 5D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | × | – | – | – |
| 3 | L42 | ○ | 1 | 1 | L52 |
| ... | ... | ... | ... | ... | ... |

FIG. 5E

LSR5 MANAGEMENT TABLE

| INPUT PORT | INPUT LABEL | RESERVE | LSPID | NOTE |
|---|---|---|---|---|
| 2 | L51 | × | – | – |
| 2 | L52 | ○ | 1 | TO UPPER LAYER AFTER DELETING LABEL |
| ... | ... | ... | ... | ... |

LSR1 MANAGEMENT TABLE

| INPUT PORT | INPUT LABEL | LSPID | OUTPUT PORT | OUTPUT LABEL |
|---|---|---|---|---|
| INPUT INFORMATION | INFORMATION OF LSR1 TO LSR5 | 1 | 1 | L21 |
| ... | ... | 1 | 1 | - |
| ... | ... | ... | ... | ... |

FIG. 6B

LSR2 MANAGEMENT TABLE

| INPUT PORT | INPUT LABEL | RESERVE | LSPID | OUTPUT PORT | OUTPUT LABEL |
|---|---|---|---|---|---|
| 2 | L21 | ◎ | 1 | 1 | L31 |
| ... | ... | | | 3 | - |
| ... | ... | ... | ... | ... | ... |

FIG. 6C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | ○ | 1 | 1 | L41 |
| ... | ... | ... | ... | ... | ... |

FIG. 6D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | ○ | 1 | 1 | L51 |
| 3 | L42 | ○ | 1 | 1 | - |
| ... | ... | ... | ... | ... | ... |

FIG. 6E

LSR5 MANAGEMENT TABLE

| INPUT PORT | INPUT LABEL | RESERVE | LSPID | NOTE |
|---|---|---|---|---|
| 2 | L51 | ◎ | 1 | TO UPPER LAYER AFTER DELETING LABEL |
| ... | ... | ... | ... | ... |

FIG. 7A

LSR1 MANAGEMENT TABLE

| INPUT INFORMATION | LSPID | OUTPUT PORT | OUTPUT LABEL |
|---|---|---|---|
| | 1 | 1 | L21 |
| INFORMATION OF LSR1 TO LSR5 | 1 | 1 | L21 |
| ... | ... | ... | ... |

FIG. 7B

LSR2 MANAGEMENT TABLE

| INPUT PORT | INPUT LABEL | RESERVE | LSPID | OUTPUT PORT | OUTPUT LABEL |
|---|---|---|---|---|---|
| 2 | L21 | ◎ | 1 | 1 | L31 |
| | | | | 3 | L42 |
| ... | ... | ... | ... | ... | ... |

FIG. 7C

LSR3 MANAGEMENT TABLE

| INPUT PORT | INPUT LABEL | RESERVE | LSPID | OUTPUT PORT | OUTPUT LABEL |
|---|---|---|---|---|---|
| 2 | L31 | ○ | 1 | 1 | L41 |
| ... | ... | ... | ... | ... | ... |

FIG. 7D

LSR4 MANAGEMENT TABLE

| INPUT PORT | INPUT LABEL | RESERVE | LSPID | OUTPUT PORT | OUTPUT LABEL |
|---|---|---|---|---|---|
| 2 | L41 | ○ | 1 | 1 | L51 |
| 3 | L42 | ○ | 1 | 1 | L51 |
| ... | ... | ... | ... | ... | ... |

FIG. 7E

LSR5 MANAGEMENT TABLE

| INPUT PORT | INPUT LABEL | RESERVE | LSPID | NOTE |
|---|---|---|---|---|
| 2 | L51 | ◎ | 1 | TO UPPER LAYER AFTER DELETING LABEL |
| ... | ... | ... | ... | ... |

FIG. 10A

| INPUT PORT | INPUT LABEL | RESERVE | IDENTIFIER | OUTPUT PORT | OUTPUT LABEL |
|---|---|---|---|---|---|
| #1 | 5 | ○ | 2 | #2 | 4 |
| #1 | 7 | × | - | - | - |
| #2 | 7 | ◎ | 1 | #1 | 5 |
| #2 | 7 | ◎ | 1 | #3 | 4 |

FIG. 10B

| INPUT LABEL | RESERVE | IDENTIFIER | OUTPUT PORT | OUTPUT LABEL |
|---|---|---|---|---|
| 5 | ○ | 2 | #2 | 4 |
| 4 | × | - | - | - |
| 7 | ◎ | 1 | #1 | 5 |
| 7 | ◎ | 1 | #3 | 4 |

FIG. 11A

LSR1 MANAGEMENT TABLE

| INPUT INFORMATION | IDENTIFIER | OUTPUT PORT | OUTPUT LABEL |
|---|---|---|---|
| INFORMATION OF LSR1 TO LSR5 | 1 | 1 | L21 |
| ... | ... | ... | ... |

FIG. 11B

LSR2 MANAGEMENT TABLE

| INPUT PORT | INPUT LABEL | RESERVE | IDENTIFIER | OUTPUT PORT | OUTPUT LABEL |
|---|---|---|---|---|---|
| 2 | L21 | O | 1 | 1 | L31 |
| ... | ... | ... | ... | ... | ... |

FIG. 11C

LSR3 MANAGEMENT TABLE

| INPUT PORT | INPUT LABEL | RESERVE | IDENTIFIER | OUTPUT PORT | OUTPUT LABEL |
|---|---|---|---|---|---|
| 2 | L31 | O | 1 | 1 | L41 |
| ... | ... | ... | ... | ... | ... |

FIG. 11D

LSR4 MANAGEMENT TABLE

| INPUT PORT | INPUT LABEL | RESERVE | IDENTIFIER | OUTPUT PORT | OUTPUT LABEL |
|---|---|---|---|---|---|
| 2 | L41 | O | 1 | 1 | L51 |
| ... | ... | ... | ... | ... | ... |

FIG. 11E

LSR5 MANAGEMENT TABLE

| INPUT PORT | INPUT LABEL | RESERVE | IDENTIFIER | NOTE |
|---|---|---|---|---|
| 2 | L51 | O | 1 | TO UPPER LAYER AFTER DELETING LABEL |
| ... | ... | ... | ... | ... |

FIG. 12A

LSR1 MANAGEMENT TABLE

| INPUT INFORMATION | IDENTIFIER | OUTPUT PORT | OUTPUT LABEL |
|---|---|---|---|
| INFORMATION OF LSR1 TO LSR5 | 1 | 1 | L21 |
| | 1 | 1 | - |
| ... | ... | ... | ... |

FIG. 12B

LSR2 MANAGEMENT TABLE

| INPUT PORT | INPUT LABEL | RESERVE | IDENTIFIER | OUTPUT PORT | OUTPUT LABEL |
|---|---|---|---|---|---|
| 2 | L21 | ○ | 1 | 1 | L31 |
| | | | | 3 | - |
| ... | ... | ... | ... | ... | ... |

FIG. 12C

LSR3 MANAGEMENT TABLE

| INPUT PORT | INPUT LABEL | RESERVE | IDENTIFIER | OUTPUT PORT | OUTPUT LABEL |
|---|---|---|---|---|---|
| 2 | L31 | ○ | 1 | 1 | L41 |
| ... | ... | ... | ... | ... | ... |

FIG. 12D

LSR4 MANAGEMENT TABLE

| INPUT PORT | INPUT LABEL | RESERVE | IDENTIFIER | OUTPUT PORT | OUTPUT LABEL |
|---|---|---|---|---|---|
| 2 | L41 | ○ | 1 | 1 | L51 |
| 3 | L42 | ○ | 1 | 1 | - |
| ... | ... | ... | ... | ... | ... |

FIG. 12E

LSR5 MANAGEMENT TABLE

| INPUT PORT | INPUT LABEL | RESERVE | IDENTIFIER | NOTE |
|---|---|---|---|---|
| 2 | L51 | ◎ | 1 | TO UPPER LAYER AFTER DELETING LABEL |
| ... | ... | ... | ... | ... |

P1 → P2 → P3 → P4

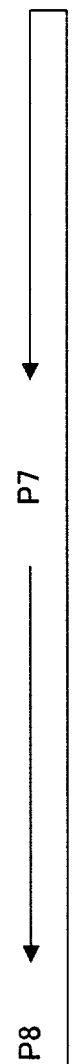
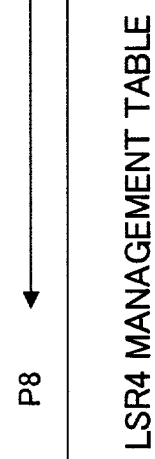

FIG. 13A — LSR1 MANAGEMENT TABLE

| INPUT INFORMATION | IDENTIFIER | OUTPUT PORT | OUTPUT LABEL |
|---|---|---|---|
|  | 1 | 1 | L21 |
| INFORMATION OF LSR1 TO LSR5 | 1 | 1 | L21 |
| ... | ... | ... | ... |

FIG. 13B — LSR2 MANAGEMENT TABLE

| INPUT PORT | INPUT LABEL | RESERVE | IDENTIFIER | OUTPUT PORT | OUTPUT LABEL |
|---|---|---|---|---|---|
| 2 | L21 | ◎ | 1 | 1 | L31 |
|  |  |  |  | 3 | L42 |
| ... | ... | ... | ... | ... | ... |

FIG. 13C — LSR3 MANAGEMENT TABLE

| INPUT PORT | INPUT LABEL | RESERVE | IDENTIFIER | OUTPUT PORT | OUTPUT LABEL |
|---|---|---|---|---|---|
| 2 | L31 | ○ | 1 | 1 | L41 |
| ... | ... | ... | ... | ... | ... |

FIG. 13D — LSR4 MANAGEMENT TABLE

| INPUT PORT | INPUT LABEL | RESERVE | IDENTIFIER | OUTPUT PORT | OUTPUT LABEL |
|---|---|---|---|---|---|
| 2 | L41 | ○ | 1 | 1 | L51 |
| 3 | L42 | ○ | 1 | 1 | L51 |
| ... | ... | ... | ... | ... | ... |

FIG. 13E — LSR5 MANAGEMENT TABLE

| INPUT PORT | INPUT LABEL | RESERVE | IDENTIFIER | NOTE |
|---|---|---|---|---|
| 2 | L51 | ◎ | 1 | TO UPPER LAYER AFTER DELETING LABEL |
| ... | ... | ... | ... | ... |

FIG. 14A

LSR1 MANAGEMENT TABLE

| INPUT INFORMATION | IDENTIFIER | OUTPUT PORT | OUTPUT LABEL |
|---|---|---|---|
| – | – | – | – |
| INFORMATION OF LSR1 TO LSR5 | 1 | 1 | L21 |
| ... | ... | ... | ... |

FIG. 14B

LSR2 MANAGEMENT TABLE

| INPUT PORT | INPUT LABEL | RESERVE | IDENTIFIER | OUTPUT PORT | OUTPUT LABEL |
|---|---|---|---|---|---|
| 2 | L21 | ○ | 1 | 3 | L42 |
| ... | ... | ... | ... | ... | ... |

FIG. 14C

LSR3 MANAGEMENT TABLE

| INPUT PORT | INPUT LABEL | RESERVE | IDENTIFIER | OUTPUT PORT | OUTPUT LABEL |
|---|---|---|---|---|---|
| 2 | L31 | × | – | – | – |
| ... | ... | ... | ... | ... | ... |

FIG. 14D

LSR4 MANAGEMENT TABLE

| INPUT PORT | INPUT LABEL | RESERVE | IDENTIFIER | OUTPUT PORT | OUTPUT LABEL |
|---|---|---|---|---|---|
| 2 | L41 | × | – | – | – |
| 3 | L42 | ○ | 1 | 1 | L51 |
| ... | ... | ... | ... | ... | ... |

FIG. 14E

LSR5 MANAGEMENT TABLE

| INPUT PORT | INPUT LABEL | RESERVE | IDENTIFIER | NOTE |
|---|---|---|---|---|
| 2 | L51 | ○ | 1 | TO UPPER LAYER AFTER DELETING LABEL |
| ... | ... | ... | ... | ... |

FIG. 15A

LSR1 MANAGEMENT TABLE

| INPUT INFORMATION | IDENTIFIER | OUTPUT PORT | OUTPUT LABEL |
|---|---|---|---|
| INFORMATION OF LSR1 TO LSR5 | 1 | 1 | L21 |
| ... | ... | ... | ... |

FIG. 15B

LSR2 MANAGEMENT TABLE

| INPUT PORT | INPUT LABEL | RESERVE | RELEAF PRIORITY | IDENTI-FIER | OUTPUT PORT | OUTPUT LABEL |
|---|---|---|---|---|---|---|
| 2 | L21 | ○ | 低 | 1 | 1 | L31 |
| ... | ... | ... | ... | ... | ... | ... |

FIG. 15C

LSR3 MANAGEMENT TABLE

| INPUT PORT | INPUT LABEL | RESERVE | RELEAF PRIORITY | IDENTI-FIER | OUTPUT PORT | OUTPUT LABEL |
|---|---|---|---|---|---|---|
| 2 | L31 | ○ | 低 | 1 | 1 | L41 |
| ... | ... | ... | ... | ... | ... | ... |

FIG. 15D

LSR4 MANAGEMENT TABLE

| INPUT PORT | INPUT LABEL | RESERVE | RELEAF PRIORITY | IDENTI-FIER | OUTPUT PORT | OUTPUT LABEL |
|---|---|---|---|---|---|---|
| 2 | L41 | ○ | 低 | 1 | 1 | L51 |
| ... | ... | ... | ... | ... | ... | ... |

FIG. 15E

LSR5 MANAGEMENT TABLE

| INPUT PORT | INPUT LABEL | RESERVE | RELEAF PRIORITY | IDENTI-FIER | NOTE |
|---|---|---|---|---|---|
| 2 | L51 | ○ | 低 | 1 | TO UPPER LAYER AFTER DELETING LABEL |
| ... | ... | ... | ... | ... | ... |

FIG. 16A

LSR1 MANAGEMENT TABLE

| | INPUT INFORMATION | IDENTI-FIER | OUTPUT PORT | OUTPUT LABEL |
|---|---|---|---|---|
| INFORMATION OF LSR1 TO LSR5 | | 1 | 1 | L21 |
| | | 1 | 1 | — |
| | ... | ... | ... | ... |

FIG. 16B

LSR2 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L21 | ◎ | LOW | 1 | 1 | L31 |
| ... | ... | | — | | 3 | — |
| ... | ... | ... | ... | ... | ... | ... |

FIG. 16C

LSR3 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L31 | ○ | LOW | 1 | 1 | L41 |
| ... | ... | ... | ... | ... | ... | ... |

FIG. 16D

LSR4 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L41 | ○ | LOW | 1 | 1 | L51 |
| 3 | L42 | ○ | — | 1 | 1 | — |
| ... | ... | ... | ... | ... | ... | ... |

FIG. 16E

LSR5 MANAGEMENT TABLE

| INPUT PORT | INPUT LABEL | RESERVE | RELEAF PRIORITY | IDENT-IFIER | NOTE |
|---|---|---|---|---|---|
| 2 | L51 | ◎ | LOW | 1 | TO UPPER LAYER AFTER DELETING LABEL |
| ... | ... | ... | ... | ... | ... |

FIG. 17A

LSR1 MANAGEMENT TABLE

| INPUT INFORMATION | IDENT-IFIER | OUTPUT PORT | OUTPUT LABEL |
|---|---|---|---|
| | 1 | 1 | L21 |
| INFORMATION OF LSR1 TO LSR5 | 1 | 1 | L21 |
| ... | ... | ... | ... |

FIG. 17B

LSR2 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L21 | ◎ | HIGH | 1 | 1 | L31 |
| | | | LOW | 1 | 1 | L42 |
| ... | ... | | ... | | ... | ... |

FIG. 17C

LSR3 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L31 | ○ | LOW | 1 | 1 | L41 |
| ... | ... | | | | | ... |

FIG. 17D

LSR4 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L41 | ○ | HIGH | 1 | 1 | L51 |
| 3 | L42 | ○ | LOW | 1 | 1 | L51 |
| ... | ... | | | | | ... |

FIG. 17E

LSR5 MANAGEMENT TABLE

| INPUT PORT | INPUT LABEL | RESERVE | RELEAF PRIORITY | IDENT-IFIER | NOTE |
|---|---|---|---|---|---|
| 2 | L51 | ◎ | HIGH | 1 | TO UPPER LAYER AFTER DELETING LABEL |
| | | | LOW | | ... |
| ... | ... | | | | |

FIG. 18A

LSR1 MANAGEMENT TABLE

| INPUT INFORMATION | IDENTIFIER | OUTPUT PORT | OUTPUT LABEL |
|---|---|---|---|
| | – | – | – |
| INFORMATION OF LSR1 TO LSR5 | 1 | 1 | L21 |
| ... | ... | ... | ... |

FIG. 18B

LSR2 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L21 | ○ | LOW | 1 | 3 | L42 |
| | | | – | – | – | – |
| ... | ... | ... | ... | ... | ... | ... |

FIG. 18C

LSR3 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L31 | × | – | – | – | – |
| ... | ... | ... | ... | ... | ... | ... |

FIG. 18D

LSR4 MANAGEMENT TABLE

| INPUT PORT | INPUT LABEL | RESERVE | RELEAF PRIORITY | IDENT-IFIER | OUTPUT PORT | OUTPUT LABEL |
|---|---|---|---|---|---|---|
| 2 | L41 | × | – | 1 | 1 | – |
| 3 | L42 | ○ | LOW | 1 | 1 | L51 |
| ... | ... | ... | ... | ... | ... | ... |

FIG. 18E

LSR5 MANAGEMENT TABLE

| INPUT PORT | INPUT LABEL | RESERVE | RELEAF PRIORITY | IDENT-IFIER | NOTE |
|---|---|---|---|---|---|
| 2 | L51 | ○ | LOW | 1 | TO UPPER LAYER AFTER DELETING LABEL |
| | | | – | | |
| ... | ... | ... | ... | ... | ... |

| INPUT PORT | INPUT WAVE LENGTH | RESERVE | IDENTI -FIER | OUTPUT PORT | OUTPUT WAVE LENGTH |
|---|---|---|---|---|---|
| #1 | $\lambda 5$ | ○ | 2 | #2 | $\lambda 4$ |
| #1 | $\lambda 7$ | × | - | - | - |
| #2 | $\lambda 7$ | ◎ | 1 | #1 | $\lambda 5$ |
| #2 | $\lambda 7$ | ◎ | 1 | #3 | $\lambda 4$ |

FIG. 22A

OPTICAL XC1 MANAGEMENT TABLE

| INPUT INFORMATION | IDENT-IFIER | OUTPUT PORT | OUTPUT WAVE LENGTH |
|---|---|---|---|
| INFORMATION OF OPTICAL XC1 TO OPTICAL XC5 | 1 | 1 | λ21 |
| ... | ... | ... | ... |

FIG. 22B

OPTICAL XC2 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ21 | O | 1 | 1 | λ31 |
| ... | ... | ... | ... | ... | ... |

FIG. 22C

OPTICAL XC3 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ31 | O | 1 | 1 | λ41 |
| ... | ... | ... | ... | ... | ... |

FIG. 22D

OPTICAL XC4 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ41 | O | 1 | 1 | λ51 |
| ... | ... | ... | ... | ... | ... |

FIG. 22E

OPTICAL XC5 MANAGEMENT TABLE

| INPUT PORT | INPUT WAVE LENGTH | RESERVE | IDENT-IFIER | NOTE |
|---|---|---|---|---|
| 2 | λ51 | O | 1 | TO UPPER LAYER |
| ... | ... | ... | ... | ... |

FIG. 24A
OPTICAL XC1 MANAGEMENT TABLE

| INPUT INFORMATION | IDENT-IFIER | OUTPUT PORT | OUTPUT WAVELENGTH |
|---|---|---|---|
| | 1 | 1 | λ21 |
| INFORMATION OF OPTICAL XC5 | 1 | 1 | λ21 |
| ... | ... | ... | ... |

FIG. 24B
OPTICAL XC2 MANAGEMENT TABLE

| INPUT PORT | INPUT WAVELENGTH | RESERVE | IDENT-IFIER | OUTPUT PORT | OUTPUT WAVELENGTH |
|---|---|---|---|---|---|
| 2 | λ21 | ◎ | 1 | 1 | λ31 |
| | | | | 1 | λ42 |
| ... | ... | ... | ... | ... | ... |

FIG. 24C
OPTICAL XC3 MANAGEMENT TABLE

| INPUT PORT | INPUT WAVELENGTH | RESERVE | IDENT-IFIER | OUTPUT PORT | OUTPUT WAVELENGTH |
|---|---|---|---|---|---|
| 2 | λ31 | ○ | 1 | 1 | λ41 |
| ... | ... | ... | ... | ... | ... |

FIG. 24D
OPTICAL XC4 MANAGEMENT TABLE

| INPUT PORT | INPUT WAVELENGTH | RESERVE | IDENT-IFIER | OUTPUT PORT | OUTPUT WAVELENGTH |
|---|---|---|---|---|---|
| 2 | λ41 | ○ | 1 | 1 | λ51 |
| 3 | λ42 | ○ | 1 | 1 | λ51 |
| ... | ... | ... | ... | ... | ... |

FIG. 24E
OPTICAL XC5 MANAGEMENT TABLE

| INPUT PORT | INPUT WAVELENGTH | RESERVE | IDENT-IFIER | NOTE |
|---|---|---|---|---|
| 2 | λ51 | ◎ | 1 | TO UPPER LAYER |
| ... | ... | ... | ... | ... |

FIG. 25A
OPTICAL XC1 MANAGEMENT TABLE

| INPUT INFORMATION | IDENT-IFIER | OUTPUT PORT | OUTPUT WAVE LENGTH |
|---|---|---|---|
| INFORMATION OF OPTICAL XC1 TO OPTICAL XC5 | — | — | — |
|  | 1 | 1 | λ21 |
| … | … | … | … |

FIG. 25B
OPTICAL XC2 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ21 | ○ | 1 | 3 | λ42 |
| … | … | … | … | … | … |

FIG. 25C
OPTICAL XC3 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ31 | × | — | — | — |
| … | … | … | … | … | … |

FIG. 25D
OPTICAL XC4 MANAGEMENT TABLE

| INPUT PORT | INPUT WAVE LENGTH | RESERVE | IDENT-IFIER | OUTPUT PORT | OUTPUT WAVE LENGTH |
|---|---|---|---|---|---|
| 2 | λ41 | × | — | — | — |
| 3 | λ42 | ○ | 1 | 1 | λ51 |
| … | … | … | … | … | … |

FIG. 25E
OPTICAL XC5 MANAGEMENT TABLE

| INPUT PORT | INPUT WAVE LENGTH | RESERVE | IDENT-IFIER | NOTE |
|---|---|---|---|---|
| 2 | λ51 | ○ | 1 | TO UPPER LAYER |
| … | … | … | … | … |

FIG. 26A
OPTICAL XC1 MANAGEMENT TABLE

| INPUT INFORMATION | IDENT-IFIER | OUTPUT PORT | OUTPUT WAVE LENGTH |
|---|---|---|---|
| INFORMATION OF OPTICAL XC1 TO OPTICAL XC5 | 1 | 1 | λ21 |
| ... | ... | ... | ... |

FIG. 26B
OPTICAL XC2 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ21 | O | LOW | 1 | 1 | λ31 |
| ... | ... | ... | ... | ... | ... | ... |

FIG. 26C
OPTICAL XC3 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ31 | O | LOW | 1 | 1 | λ41 |
| ... | ... | ... | ... | ... | ... | ... |

FIG. 26D
OPTICAL XC4 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ41 | O | LOW | 1 | 1 | λ51 |
| ... | ... | ... | ... | ... | ... | ... |

FIG. 26E
OPTICAL XC5 MANAGEMENT TABLE

| INPUT PORT | INPUT WAVE LENGTH | RESERVE | RELEAF PRIORITY | IDENT-IFIER | NOTE |
|---|---|---|---|---|---|
| 2 | λ51 | O | LOW | 1 | TO UPPER LAYER |
| ... | ... | ... | ... | ... | ... |

FIG. 27A
OPTICAL XC1 MANAGEMENT TABLE

| INPUT INFORMATION | IDENT-IFIER | OUTPUT PORT | OUTPUT WAVE LENGTH |
|---|---|---|---|
| INFORMATION OF OPTICAL XC1 TO OPTICAL XC5 | 1 | 1 | λ21 |
| | 1 | 1 | - |
| ... | ... | ... | ... |

FIG. 27B
OPTICAL XC2 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ21 | ◎ | LOW | 1 | 1 | λ31 |
| | | | - | 1 | 1 | - |
| ... | ... | ... | ... | ... | ... | ... |

FIG. 27C
OPTICAL XC3 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ31 | ○ | LOW | 1 | 1 | λ41 |
| ... | ... | ... | ... | ... | ... | ... |

FIG. 27D
OPTICAL XC4 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ41 | ○ | LOW | 1 | 1 | λ51 |
| 3 | λ42 | ○ | - | 1 | 1 | - |
| ... | ... | ... | ... | ... | ... | ... |

FIG. 27E
OPTICAL XC5 MANAGEMENT TABLE

| INPUT PORT | INPUT WAVE LENGTH | RESERVE | RELEAF PRIORITY | IDENT-IFIER | NOTE |
|---|---|---|---|---|---|
| 2 | λ51 | ◎ | - | 1 | TO UPPER LAYER |
| | | | LOW | | |
| ... | ... | ... | ... | ... | ... |

FIG. 28A

OPTICAL XC1 MANAGEMENT TABLE

| INPUT INFORMATION | IDENT-IFIER | OUTPUT PORT | OUTPUT WAVE LENGTH |
|---|---|---|---|
| | 1 | 1 | λ21 |
| INFORMATION OF OPTICAL XC1 TO OPTICAL XC5 | 1 | 1 | λ21 |
| ... | ... | ... | ... |

FIG. 28B

OPTICAL XC2 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ21 | ◎ | HIGH | 1 | 1 | λ31 |
| | | | LOW | | 1 | λ42 |
| ... | ... | ... | ... | ... | ... | ... |

FIG. 28C

OPTICAL XC3 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ31 | ○ | LOW | 1 | 1 | λ41 |
| ... | ... | ... | ... | ... | ... | ... |

FIG. 28D

OPTICAL XC4 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ41 | ○ | HIGH | 1 | 1 | λ51 |
| 3 | λ42 | ○ | LOW | 1 | 1 | λ51 |
| ... | ... | ... | ... | ... | ... | ... |

FIG. 28E

OPTICAL XC5 MANAGEMENT TABLE

| INPUT PORT | INPUT WAVE LENGTH | RESERVE | RELEAF PRIORITY | IDENT-IFIER | NOTE |
|---|---|---|---|---|---|
| 2 | λ51 | ◎ | HIGH | 1 | |
| | | | LOW | | TO UPPER LAYER |
| ... | ... | ... | ... | ... | ... |

FIG. 29A
OPTICAL XC1 MANAGEMENT TABLE

| INPUT INFORMATION | IDENT-IFIER | OUTPUT PORT | OUTPUT WAVE LENGTH |
|---|---|---|---|
| - | - | - | - |
| INFORMATION OF OPTICAL XC1 TO OPTICAL XC5 | 1 | 1 | λ21 |
| ... | ... | ... | ... |

FIG. 29B
OPTICAL XC2 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ21 | O | LOW | 1 | 3 | λ42 |
| ... | ... | ... | ... | ... | ... | ... |

FIG. 29C
OPTICAL XC3 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ31 | × | - | - | - | - |
| ... | ... | ... | ... | ... | ... | ... |

FIG. 29D
OPTICAL XC4 MANAGEMENT TABLE

| INPUT PORT | INPUT WAVE LENGTH | RESERVE | RELEAF PRIORITY | IDENT-IFIER | OUTPUT PORT | OUTPUT WAVE LENGTH |
|---|---|---|---|---|---|---|
| 2 | λ41 | × | - | - | - | - |
| 3 | λ42 | O | LOW | 1 | 1 | λ51 |
| ... | ... | ... | ... | ... | ... | ... |

FIG. 29E
OPTICAL XC5 MANAGEMENT TABLE

| INPUT PORT | INPUT WAVE LENGTH | RESERVE | RELEAF PRIORITY | IDENT-IFIER | NOTE |
|---|---|---|---|---|---|
| 2 | λ51 | O | LOW | 1 | TO UPPER LAYER |
| ... | ... | ... | ... | ... | ... |

PATH ROUTE MODIFICATION METHOD AND SWITCHING SYSTEM USING THE SAME

FIELD OF THE INVENTION

The present invention relates to a network system having a label switching function or a wavelength switching function, and more particularly a method for modifying a route of either label path or wavelength path, and a switching system using the method.

BACKGROUND OF THE INVENTION

In a network configured with a plurality of switching systems each having a packet transfer function, there is a known technology that switching a packet having a label is controlled based on a packet forwarding table provided in each switching system.

The forwarding table includes either an input label or a combination of input port and input label each corresponding to a combination of output port and output label.

In the conventional method, a switching system performs packet transfer when a short and fixed-length label included in each packet coincides completely with any of the contents of such a forwarding table. This enables high speed transfer processing. Also, because each communication is mainly performed through an established connection, the method is also suitable for traffic engineering such as load sharing.

In regard to such a label switching method, standardization has been studied and developed in Multi Protocol Label Switching (MPLS) Working Group in the Internet Engineering Task Force (IETF).

In the meantime, an optical wavelength division multiplexing (WDM) network begins to use to cope with traffic increase. In such a WDM network, a wavelength switching system has been attracting a wide attention, in which wavelength switching system is combined with WDM transmission equipment.

Such a wavelength switching system can be regarded equivalent to a label switching system by regarding a wavelength as a label. As a procedure of modifying a path route in such either label switching system or wavelength switching system, a route modification procedure specified in Constraint-based Routing Label Distribution Protocol (CR-LDP) is applicable.

However, there is a problem in this route modification procedure specified in this CR-LDP. On the way to the route modification, despite that information actually flows on only one route at a time, two labels for both a new route and an old route are required to reserve in a label switch router (LSR) being located where these old and new routes overlap.

In other words, on such location where the old route and new route overlap, it is not possible in the conventional method to share a single label for both old and new routes. This results in waste of labels though it occurs temporarily during the modification procedure. Therefore, this route modification procedure specified in CR-LDP becomes ineffective in such a situation as the reservation of an extra label is not possible.

Generally in a label switching system, there is sufficient label space and no relation between labels and other resources. Therefore, the aforementioned problem will not cause a serious problem. However, in an optical wavelength switching system in which an optical wavelength is regarded as a label, available wavelengths are closely related to the system bandwidths, and regrettably the number of multiplexed wavelengths in an optical fiber is not sufficiently large at present. This results in a limited label space in an optical wavelength switching system and may cause a problem, which cannot be overlooked.

SUMMARY OF THE INVENTION

Accordingly it is an object of the present invention to provide a method for modifying either a label path route or a wavelength path route and switching system using the method. The proposed method enables to use an identical label in such a case (network location and situation of the path route modification) that a new route overlaps with an old route. Accordingly a flexible route modification becomes possible even in case of wavelength switching, etc. having a substantially limited label space as well as having labels closely related to other resources.

In accordance with the present invention to solve the aforementioned problem, a packet switching system having a function of label path route modification has the following feature: The packet switching system includes a table for mapping either an input label value or a set of input label value and input port to an output port and an output label, wherein a state variable is set for either the input label value or the set of input label value and input port mapped in the table to represent either of the three states of 'not reserved', 'reserved', and 'double reserved'; and a packet switch for packet-switching packet data according to the information mapped in the table.

Also, in accordance with the present invention to solve the aforementioned problem, an optical cross-connect system having a function of wavelength path route modification has the following feature: The optical cross-connect system includes a table for mapping a set of input wavelength and input port to an output port and an output wavelength. A state variable is set for either the input wavelength or the combination of input wavelength and input port mapped in the table to represent either of the three states of 'not reserved', 'reserved', and 'double reserved'; and cross-connect equipment for converting wavelengths according to the information mapped in the table.

As an embodiment of the present invention to solve the aforementioned problem, there is provided a route modification method for modifying a label path from an old route to a new route in a network constituted by a plurality of packet switching systems connected by transmission lines. The method includes the steps of: including in a label request for a new route an identifier indicating an old route having a sharable label; forwarding the label request from a packet switching system located on upstream side to a packet switching system located on downstream side along the new route; in the packet switching system located on the downstream side, setting the label for the old route to a double reserved state in case the new route being requested in the label request overlaps with the old route, or reserving a new label in case the new route does not overlap with the old route; notifying the packet switching system located upstream from the packet switching system located downstream about the each reserved label; forwarding a label release request explicitly specifying the old route to the packet switching system located on downstream side along the old route; and in the packet switching system, when receiving the label release request, either setting the double reserved label to a reserved state being reserved only for the new route in case the new route overlaps with the old route, or releasing the label for old route in case the new route does not overlap with the old route.

As another embodiment of the present invention to solve the aforementioned problem, there is provided a route modification method for modifying a label path from an old route to a new route in a network constituted by a plurality of packet switching systems connected by transmission lines. The method includes the steps of: including in a label request for a new route an identifier indicating an old route having a sharable label; forwarding the label request from packet switching system located on upstream side to packet switching system located on downstream side along the new route; in the packet switching system located on downstream side, setting the label for the old route to a double reserved state in case the new route being requested in the label request overlaps with the old route, or reserving a new label in case the new route does not overlap with the old route; notifying packet switching system located upstream from packet switching system located downstream about the each reserved label; in the packet switching system located on upstream side, when receiving the reserved label, setting for an old label a release priority higher than a release priority for a new label; forwarding a label release request to packet switching system located on downstream side along the old route; and in packet switching system, when receiving the label release request, either setting the double reserved label to a reserved state being reserved only for the new route in case the new route overlaps with the old route, or releasing the label for old route having the higher release priority in case the new route does not overlap with the old route.

Further, as an embodiment of the present invention to solve the aforementioned problem in a network constituted by a plurality of optical cross-connect units connected by transmission lines, there is provided a route modification method for modifying a wavelength path from an old route to a new route. The method includes the steps of: including in a wavelength request for a new route, an identifier indicating an old route having a sharable wavelength; forwarding the wavelength request from an optical cross-connect system located on upstream side to an optical cross-connect system located on downstream side along the new route; in the optical cross-connect system located on downstream side, setting the wavelength for the old route to a double reserved state in case the new route being requested in the wavelength request overlaps with the old route, or reserving a new wavelength in case the new route does not overlap with the old route; notifying the optical cross-connect system located upstream from the optical cross-connect system located downstream about the each reserved wavelength; forwarding a wavelength release request explicitly specifying the old route to the optical cross-connect system located on downstream side along the old route; and in the optical cross-connect system, when receiving the wavelength release request, either setting the double reserved wavelength to a reserved state being reserved only for the new route in case the new route overlaps with the old route, or releasing the wavelength for old route in case the new route does not overlap with the old route.

Still further, as another embodiment of the present invention to solve the aforementioned problem in a network constituted by a plurality of optical cross-connect units connected by transmission lines, there is provided a route modification method for modifying a wavelength path from an old route to a new route. The method includes the steps of: including in a wavelength request for a new route an identifier indicating an old route having a sharable wavelength; forwarding the wavelength request from an optical cross-connect system located on upstream side to an optical cross-connect system located on downstream side along the new route; in the optical cross-connect located on downstream side, setting the wavelength for the old route to a double reserved state in case the new route being requested in the wavelength request overlaps with the old route, or reserving a new wavelength in case the new route does not overlap with the old route; notifying the optical cross-connect system located upstream from the optical cross-connect system located downstream about the each reserved wavelength; in the optical cross-connect located on upstream side, when receiving the reserved wavelength, setting for an old wavelength a release priority higher than a release priority for a new wavelength; forwarding a wavelength release request to the optical cross-connect system located on downstream side along the old route; and in the optical cross-connect system, when receiving the wavelength release request, either setting the double reserved wavelength to a reserved state being reserved only for the new route in case the new route overlaps with the old route, or releasing the wavelength for old route having the higher release priority in case the new route does not overlap with the old route.

Further scopes and features of the present invention will become more apparent by the following description of the embodiments with the accompanied drawings.

BRIEF DESCRIPTION OF THE DRAWINGS

FIGS. 2A to 2E show diagrams, each illustrating a management table.

FIG. 3 shows a diagram illustrating a process of forwarding a label request message.

FIG. 4 shows a diagram illustrating a process of notifying a reserved label using a label mapping message.

FIG. 5 shows a diagram illustrating a process of issuing a label release message.

FIG. 6 shows a diagram illustrating a process of sending a label request message in the first embodiment.

FIG. 7 shows a diagram illustrating a process of notifying a reserved label using a label mapping message in the first embodiment.

FIG. 8 shows a diagram illustrating a process of issuing a label release message in the first embodiment.

FIGS. 10A and 10B show examples of label management table contents in the configuration using packet switching system.

FIGS. 11A to 11E show diagrams, each illustrating the contents of the label management table when route I is established in the first embodiment of the configuration example using the packet switching system shown in FIG. 9.

FIG. 12 shows a diagram illustrating a process of sending a label request message in the first embodiment of the configuration example using the packet switching system shown in FIG. 9.

FIG. 13 shows a diagram illustrating a process of notifying a reserved label using a label mapping message in the first embodiment of the configuration example using the packet switching system shown in FIG. 9.

FIG. 14 shows a diagram illustrating a process of issuing a label release message in the first embodiment of the configuration example using the packet switching system shown in FIG. 9.

FIGS. 15A to 15E show diagrams, each illustrating contents of the label management table when route I is established in the second embodiment of the configuration example using the packet switching system shown in FIG. 9.

FIG. 16 shows a diagram illustrating a process of sending a label request message in the second embodiment of the configuration example using the packet switching system shown in FIG. 9.

FIG. 17 shows a diagram illustrating a process of notifying a reserved label using a label mapping message in the second embodiment of the configuration example using the packet switching system shown in FIG. 9.

FIG. 18 shows a diagram illustrating a process of issuing a label release message in the second embodiment of the configuration example using the packet switching system shown in FIG. 9.

FIGS. 22A to 22E show diagrams, each illustrating contents of the wavelength management table when route I is established in the first embodiment of the configuration example using the optical cross-connect shown in FIG. 19.

FIG. 23 shows a diagram illustrating a process of sending a wavelength request message in the first embodiment of the configuration example using the optical cross-connect shown in FIG. 19.

FIG. 24 shows a diagram illustrating a process of notifying a reserved wavelength using a wavelength notification message in the first embodiment of the configuration example using the optical cross-connect shown in FIG. 19.

FIG. 25 shows a diagram illustrating a process of issuing a wavelength release message in the first embodiment of the configuration example using the optical cross-connect shown in FIG. 19.

FIG. 26 show diagrams, each illustrating contents of the wavelength management table when route I is established in the second embodiment of the configuration example using the optical cross-connect shown in FIG. 19.

FIG. 27 shows a diagram illustrating a process of sending a wavelength request message in the second embodiment of the configuration example using the optical cross-connect shown in FIG. 19.

FIG. 28 shows a diagram illustrating a process of notifying a reserved wavelength using a wavelength notification message in the second embodiment of the configuration example using the optical cross-connect shown in FIG 19.

FIG. 29 shows a diagram illustrating a process of issuing a wavelength release message in the second embodiment of the comfiguration example using the optical cross-connect shown in FIG 19.

DETAILED DESCRIPTION OF THE PREFERRED EMBODIMENTS

The preferred embodiments of the present invention are described hereinafter referring to the charts and drawings, wherein like numerals or symbols refer to like parts.

For the sake of easier understanding of the present invention, the aforementioned conventional route modification method in switching system is explained prior to the description of the present invention.

Figure 1:
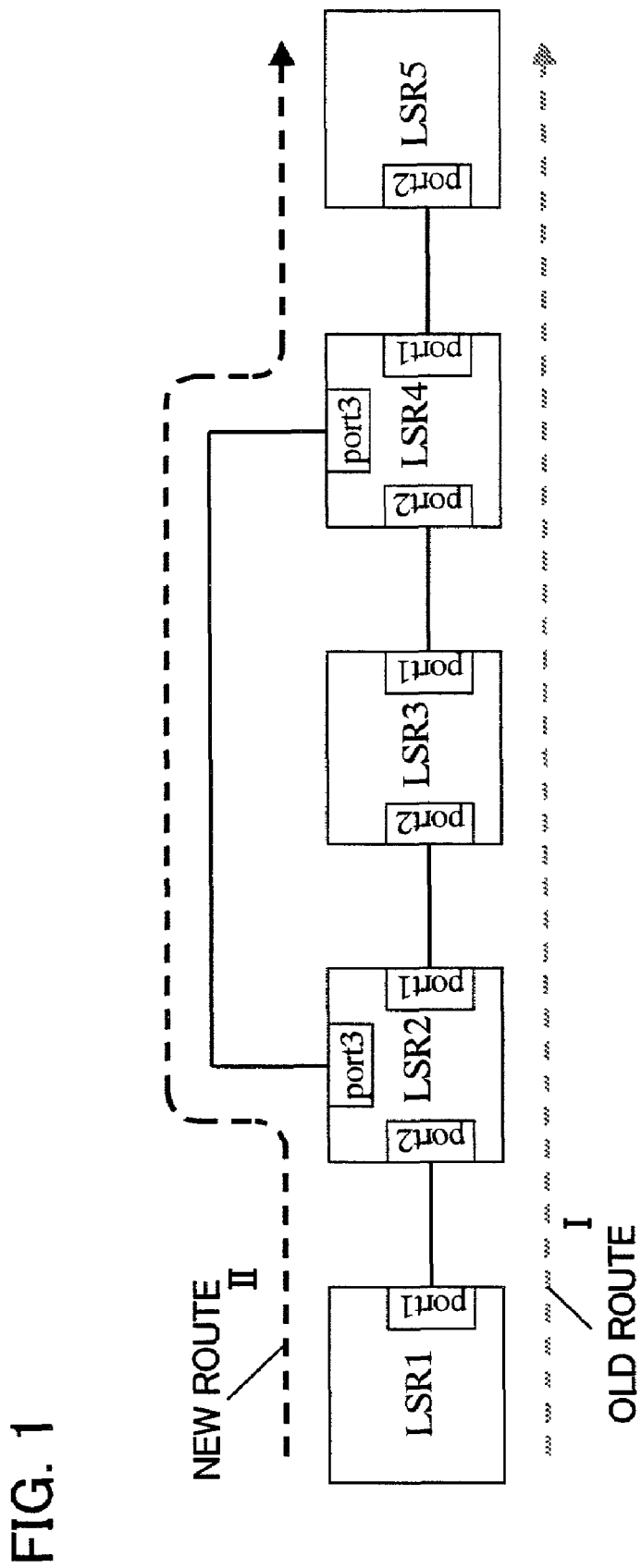
FIG. 1 shows an example of a network configuration constituted by label switching systems each functioning as switch equipment.

FIG. 1 shows an example of a network configuration, which includes five (5) label switching routers (LSR) as switching systems.

In FIG. 1, a plurality of label switching systems are connected using a physical transmission medium such as an optical fiber and coaxial line: between LSR1 and LSR2, LSR2 and LSR3, LSR3 and LSR4, LSR4 and LSR5, and moreover between LSR2 and LSR4.

In the initial state, as shown with a fine dotted line in FIG. 1, there has been established a label switching path (LSP) I having a route from LSR1 to LSR5 through LSR2, LSR3 and LSR4.

Here, each of label switching systems LSR1, LSR2, LSR3, LSR4 and LSR5 has the own management table A, B, C, D or E shown in FIGS. 2A to 2E.

Each management table A to E includes data for transmitting information along route I through LSR1, LSR2, LSR3, LSR4 and LSR5, including corresponding input information, an LSPID for identifying label switching path, input and output ports, and input and output label.

Information being transmitted along the label switching path of route I is forwarded to LSR2 after label L21 is added in LSR1. In LSR2, label L21 is replaced by label L31 to forward to LSR3.

LSR3 replaces label L31 by label L41 to forward to LSR4, and LSR4 replaces label L41 by label L51 to forward to LSR5. LSR5 then deletes the label. Thus the information is transmitted from LSR1 to LSR5.

Now, there is assumed a case that the label switching path of route I is to be modified to another label switching path of route II passing through LSR1–LSR2–LSR4–LSR5.

In this case, as a first step, LSR1 located at the entry point of the label switching path of route II forwards a Label Request Message along new route II to LSR2 located downstream next to LSR1.

LSR1 then waits for a Label Mapping Message corresponding to the Label Request Message to be transmitted from LSR2. The state at this time is described hereafter corresponding to varied contents of each table shown in FIG. 3.

In FIG. 3, when LSR2 receives the aforementioned Label Request Message from LSR1 (procedure p2), LSR2 reserves a new label L22 for new route II (FIG. 3B).

At this time, LSR2 defers transmitting a Label Mapping Message back to LSR1 until an output label corresponding to label L22 is fixed.

In order to obtain the output label corresponding to label L22, LSR2 further forwards a Label Request Message to the next LSR4 located downstream (procedure P3). LSR4 also reserves a new label L42 for the new route (FIG. 3C).

LSR4 defers transmitting a Label Mapping Message back to LSR2 until an output label corresponding to label L42 is fixed.

Next, in order to obtain the output label corresponding to label L42, LSR4 further forwards a Label Request Message to the next LSR5 located downstream (procedure P4). LSR5 also reserves a new label L52 for new route II.

Thus new route II is fixed, and therefore as a next step the reserved label is notified using a Label Mapping Message. This situation is explained hereafter referring to FIG. 4. LSR5 notifies LSR4, located upstream immediately before LSR5, of the reserved label for new route II using a Label Mapping Message (procedure P5).

Successively from the label switching system located downstream, each output label corresponding to each input label is fixed. That is, LSR4 notifies LSR2 of label L42, and LSR2 notifies LSR1 of label L22, indicating that each new label has been reserved for new route II using each Label Mapping Message (procedures P6, P7 and P8).

Accordingly, a path is fixed for new route II. LSR1 then changes the route for transmitting information from old route I to new route II (procedure P8).

Thus old route I becomes unnecessary. As the third step, therefore, LSR1 issues a Label Release Message specifying old label L21 (procedure P9). This situation is described hereafter referring to FIG. 5.

On receipt of the aforementioned Label Release Message, LSR2 forwards a Label Release Message to LSR3 specifying output label L31 corresponding to label L21, and then releases label L21 (procedure P10).

Successively, LSR3 and LSR4 perform the similar processing (procedures P11, P12). When LSR5 releases label L51, release of old route I is completed (procedure P13).

As mentioned above, according to the conventional method, two labels are reserved in the midst of route modification procedure at each LSR in which new route II overlaps with old route I, despite that at any time actual information flows on only a single route.

For example, in the case of LSR2 shown in FIG. 3, label L21 is reserved data flow route I. In addition, for new route II initiated by the Label Request Message, the new label L22 is reserved. Thus two labels are reserved at this stage. This state continues until the Label Release Message against label L21 for old route I is received (refer to FIG. 5B).

Accordingly, the present invention is aimed to solve the problem of such duplicated registration of labels reserved for an old route and a new route instead of sharing a single label. To explain the present invention comprehensively, in the conventional method, label sharing is not possible between an old route and a new route. This is because LSR managing each label cannot identify a state of one label being reserved for a plurality of routes in the conventional method.

In order to solve the above-mentioned problem, according to the present invention, there are introduced, in each LSR, state variables enabling to maintain the three states of; 'not reserved', 'reserved' and 'doubly reserved', corresponding to each input label.

This makes it possible to recognize a path to be double reserved temporarily in the midst of route modification. The outline of this procedure is explained hereafter referring to FIGS. 6 to 8. Now, in a network shown in FIG. 1, it is assumed that there is route I from LSR1 to LSR5 through LSR2, LSR3 and LSR4, and that route modification is to be performed from route I to route II which is originated from LSR1 to LSR5 through LSR2 and LSR4.

Here, note that a forwarding table to be used for actual information forwarding may be implemented separately from management tables, respectively shown in FIGS. 2A to 2E, or otherwise may be implemented combined with the management table into one table form.

When performing the aforementioned route modification, as a first step, a message requesting a label, for example a Label Request Message specified in CR-LDP is forwarded along the new route toward LSR located downstream.

In the label request message, there is included a path identifier indicating the route to be modified using, for example, LSPID of TLV (type-level-value) parameters in CR-LDP, in addition to information related to the new route. This situation is explained referring to FIG. 6.

In LSR of which the input port for new route II is identical to the input port for old route I, such as LSR2, when the Label Request Message which requests a label is received (procedure P2), the LSR doubly reserves the label having been in use for old route I (as shown with ⊚ in FIG. 6B), and then forwards a Label Request Message to the next LSR4 located downstream to request a label (procedure P3).

In other LSR, such as LSR4 in which the input port for new route II is not identical to the input port for old route I (including LSR which old route I does not pass through), the LSR reserves a new label. The LSR then forwards a Label Request Message requesting a label to the next LSR5 located downstream (procedure P3).

In such a manner, Label Request Messages are transferred on new route II successively from the upstream side to the downstream side. When the message reaches LSR5 being located at the exit of new route II (procedure P4), LSR5 reserves a label according to the received label request, and then notifies the previous LSR4 being located upstream of this reserved label along new route II. This label notification is performed using, for example, a Label Mapping Message specified in CR-LDP.

This Label Mapping Message includes an identifier denoting the path to which this label belongs, and a label value for this route which has been reserved in the originator of the message. This situation is illustrated in FIG. 7. On receipt of the message, LSR4 stores the contents in the message into an internal management table, and then forwards a Label Mapping Message to notify the previous LSR2 being located upstream of the reserved label.

When this message reaches LSR1 being located at the entry point of the new route, new route II is established.

Thus old route I becomes no more necessary. Therefore LSR1 forwards a message along old route I to request to release the label of old route I to the next LSR2 being located downstream. For this purpose, for example a Label Release Message specified in CR-LDP is used.

This situation is shown in FIG. 8. This Label Release Message includes the path identifier to be deleted. On receipt of this message, the LSR, in which the label being indicated to release is a doubly reserved label, for example LSR2, changes the state of the label being reserved only for new route II now. Meanwhile, the other LSR in which the label being indicated to release is reserved only for old route I, for example LSR4, changes the state of the label being not reserved now.

Next, embodiments of the present invention are described hereafter giving more concrete examples.

Figure 9:
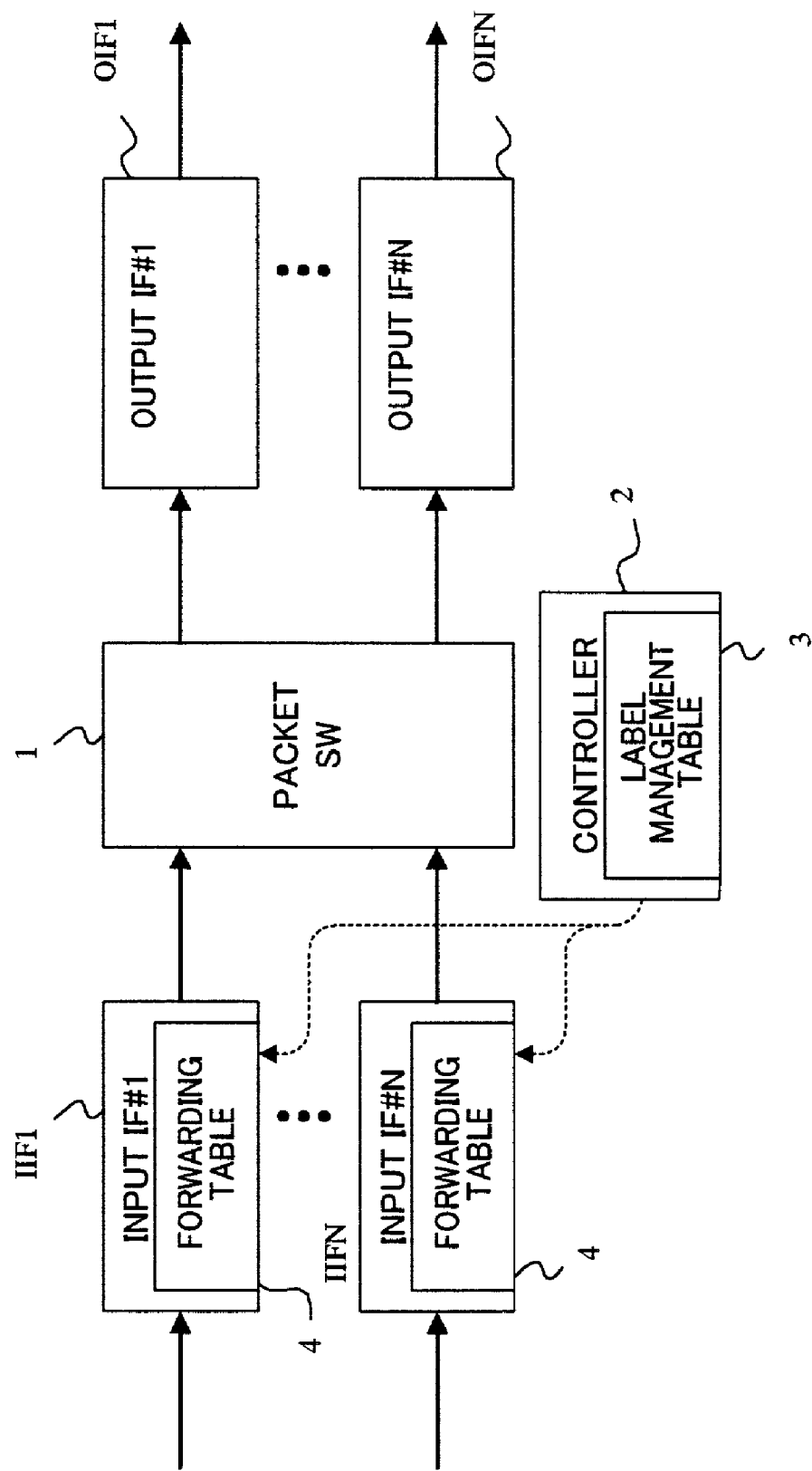
FIG. 9 shows an example of a system configuration in which label switching system is applied to packet switching system.

In FIG. 9, there is shown a configuration example in which label switching system is applied to packet switching system, as a second embodiment of the present invention. The packet switching system shown in FIG. 9 includes a packet switch 1, a plurality of input interfaces IIF1 to IIFN being connected to the input side of packet switch 1, and a plurality of output interfaces OIF1 to OIFN. Also packet switching system includes a controller 2.

Controller 2 has a label management table 3. Each plurality of input interfaces IIF1 to IIFN has a forwarding table 4.

This forwarding table 4 is set by controller 2 shown in FIG. 9. In label management table 3 provided in controller 2, information sets related to the label to which a procedure is being executed for either establishing a path or modifying a route, as well as label information for use in packet forwarding.

In this label management table 3, there is provided a state variable for either each input label or each combination of input label and input port number, indicating one of the three states of 'not reserved', 'reserved' and 'double reserved'. In FIGS. 10A and 10B, an example of the contents of label management table 3 is shown.

In FIGS. 10A and 10B, an indicator 'X' denotes 'not reserved', 'o' denotes 'reserved', and '⊚' denotes 'double reserved'. Management table 3 shown in FIG. 10A indicates a case in which a combination of an input label value and an input port number is mapped to an output port number and an output label. Meanwhile, management table 3 shown in FIG. 10B indicates another case that an output port number and an output label are mapped against an input label value.

Now, a route modification procedure is described hereafter taking a specific example. A network similar to that shown in FIG. 1 is also assumed in the following description. Namely, the network includes five label switching systems LSR1 to LSR5 each constituted by a label switch router (LSR).

Label switching systems (or simply referred to as LSR) are connected using a transmission medium such as an optical fiber. There are connections between LSR1 and LSR2, between LSR2 and LSR3, between LSR 3, LSR4, between LSR4 and LSR5, and between LSR2 and LSR4.

It is assumed in such a network that there has been established a label switching path (LSP) constituting route I being originated from LSR1 and terminated by LSR5, in order of LSR1–LSR2–LSR3–LSR4–LSR5. The contents of label management table 3 at that time is as shown in FIGS. 11A to 11E.

Now hereafter a case is explained that, in these label switching systems, the route is to be modified from aforementioned route I to a route passing through LSR1–LSR2–LSR4–LSR5. As a first step, as shown in FIG. 12, a label request message is forwarded to the label switching systems along new route II from LSR located at the entry point of route I.

Namely, LSR1 located at the entry of route II forwards a message requesting a label for route II along new route II using, for example, Label Request Message specified in CR-LDP to the next LSR2 located downstream.

Such a message requesting a label includes route information, which indicates new route II, and a path identifier, which indicates the path to be modified.

On receipt of this label request message, LSR2 recognizes from the received path identifier that old route I corresponding to this path has the identical input port to that receiving the message. Therefore LSR2 reserves the label L21 again which is the identical value of the input label for old route I (as shown with ⊚ in FIG. 12B).

The notification of the reserved label value of L21 to LSR1 is deferred until an output label for new route II is reported from the downstream side. Also, LSR2 recognizes from the received route information that new route II will pass through port 3 to LSR4.

LSR2 then forwards a message requesting a label using, for example, Label Request Message specified in CR-LDP to LSR4 so as to obtain an output label for new route II.

On receipt of this message, LSR4 recognizes from the received path identifier that the path for the old route I uses a port different from the port on which the message was received.

LSR4 then reserves a new label L42 for new route II. However, the notification of the reserved label value of L42 to LSR2 is deferred until an output label for new route II is reported from the downstream side. Also, LSR4 recognizes from the received route information that new route II is to be extended to LSR5 through port 1.

On receipt of this message, LSR5 recognizes from the received path identifier that the path for old route I uses the identical input port on which the message was received. Therefore LSR5 reserves the label L51 again which is the identical value of the input label for old route I (as shown with ⊚ in FIG. 12E).

Now route II is fixed and the procedure proceeds to the second step shown in FIG. 13. In the second step, the reserved label is notified from LSR5 located at the exit point back to the other label switching systems LSR along new route II. As a message for notifying the label, for example, a Label Mapping Message specified in CR-LDP is used. Namely, LSR5 notifies LSR4, located upstream previous to LSR5, of the reserved label L51 for new route II using, for example, a Label Mapping Message (procedure P6).

This message includes a path identifier and a label value for notification. On receipt of this message, LSR4 stores the label value L51 into the table entry corresponding to new route II in management table 3.

Thus entire contents of management table 3 become to have effective values, and the contents are reflected to forwarding table 4. Also, LSR4 notifies LSR2 of the label value L42 having been reserved for new route II. LSR2 then performs the similar processing as LSR4.

LSR1 stores the received label value into management table 3. The procedure then proceeds to the third step shown in FIG. 14.

In the third step, first LSR1 located at the entry forwards along old route I, to next LSR2 being located downstream, a message for requesting LSR2 to release the label for old route I.

This release request message includes the path identifier and path information related to old route I. On receipt of this message, LSR2 recognizes from the received path identifier that to release label L21 is requested. Accordingly, LSR2 releases label L21 and modifies the condition of 'double reserved' to simple 'reserved'.

Also, LSR2 deletes the output label information related to old route I and forwards a message requesting the release of label L31 to LSR3. LSR3 then determines from the path identifier the request is to release label L31, and modifies the condition of label L31 to 'not reserved' state and deletes the output label information (as shown with X in FIG. 14C).

LSR3 also forwards a message to LSR4 requesting to release label L41. LSR4 determines from the path identifier and the route information that the request is to release label L41, to modify the condition of label L41 to 'not reserved' state and deletes the output label information.

Further, LSR4 forwards to LSR5 a message requesting to release label L51. LSR5 determines from the path identifier that the request is to release label L51, and modifies the condition of label L51 from 'double reserved' state to 'reserved' state (as shown with o in FIG. 14E). As a result of these procedures, new route II is established and old route I is released.

Next, hereafter another embodiment of the present invention is explained. A network configuration, a route on label switching systems having been set previously, and a new route are identical to these in the above-mentioned embodiment. The contents of label management table 3 before route modification is also assumed as shown in FIGS. 15A to 15E.

In this embodiment, only one point different from the aforementioned embodiment is that a release priority is newly added. A situation in the first step is shown in FIG. 16. As described above, the contents of label management table are the same as those of label management table shown in FIG. 12 except that release priority is added in FIG 16. The release priority values are not varied in the processing of messages which request labels for route II.

A situation in the second step is shown in FIG. 17. When label information for new route II is received from the downstream side, the release priority of the label for old route I is changed to a higher value than the release priority of the label for new route II. Other procedure is identical to that of the former embodiment.

A situation in the third step is shown in FIG. 18. In the third step, first LSR1 located at the entry point forwards a label release message to the next LSR2 located downstream along old route I, requesting to release the label corresponding to old route I.

The label release message includes a path identifier. On receipt of this message, LSR2 recognizes, from the path identifier and the release priority that a label release request is to be forwarded to LSR3.

Also, when recognizing from the path identifier that the request is to release label L21, LSR2 releases label L21 and then changes the condition of label L21 from 'double reserved' to 'reserved' indicating the reservation for only the new route (as shown in the priority field and with a reservation mark ○ in FIG. 18B). Further, determining from the release priority, LSR2 deletes output label information for old route I, and then forwards a label release message to LSR3 requesting to release the label for old route I.

LSR3 determines the request is to release label L31 because there is only one entry corresponding to path identifier '1' LSR3 also determines that a release request message to be forwarded next is to LSR4. LSR3 changes the condition of label L31 to 'not reserved' and deletes the output label information.

LSR3 then forwards a label release request to LSR4. LSR4 determines from the path identifier and the release priority that the request is to release label L41 and also a release request message is to be forwarded to LSR5. LSR4 then changes the condition of label L41 to 'not reserved' and deletes the output label information.

LSR4 also forwards a label release message to LSR5. LSR5 determines from the path identifier, that the request is to release label L51 and changes the condition of label L51 from 'double reserved' to 'reserved'.

Thus through the above-mentioned procedure new route II is established and old route I is released.

Figure 19:
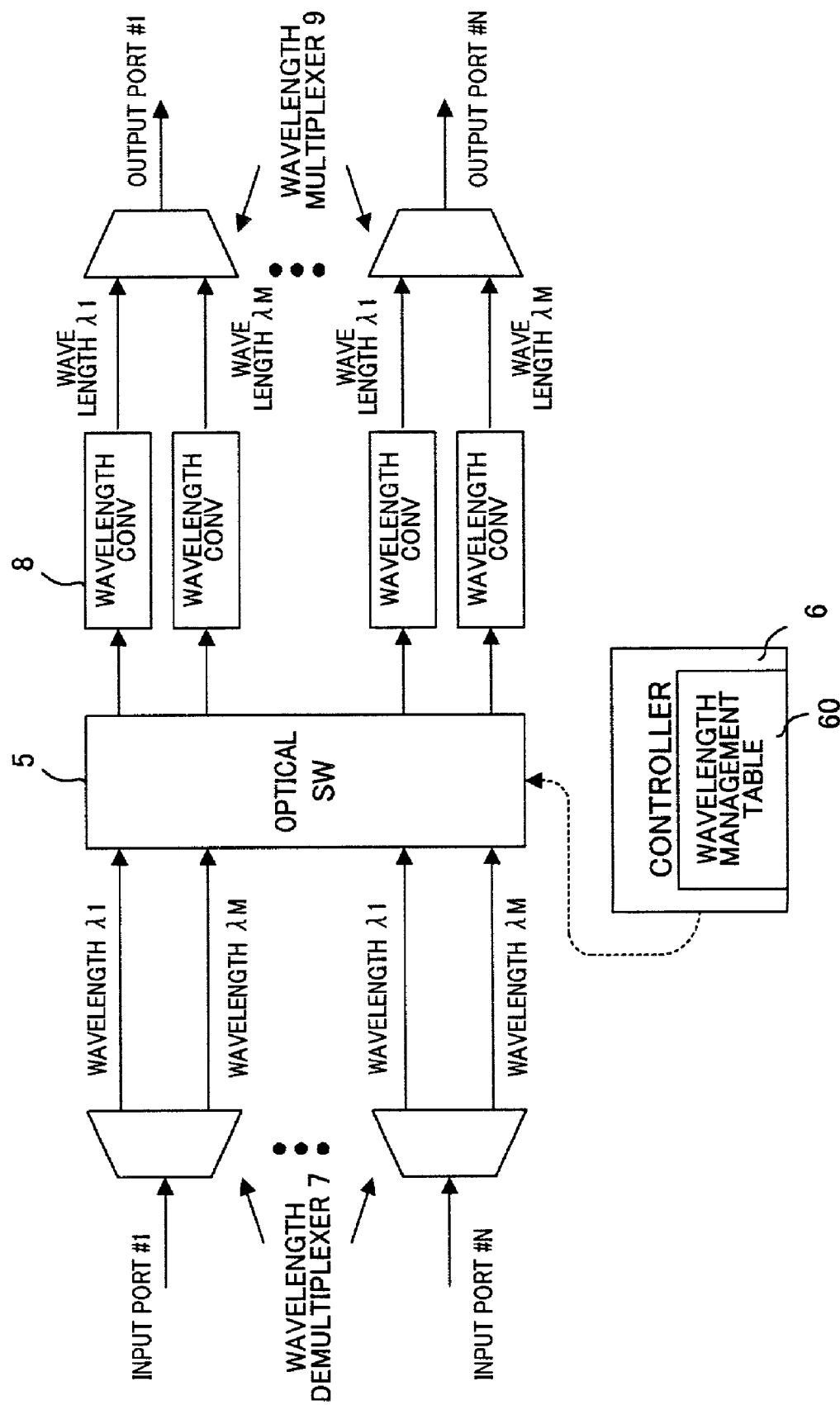
FIG. 19 shows an example of a system configuration in which a label switching is applied to an optical cross-connect.

Now, a third embodiment is explained hereafter. In FIG. 19, there is shown an optical cross-connect as a configuration example of label switching system in the third embodiment. As a main portion of the optical cross-connect, an optical switch 5 is provided, as well as a controller 6 for controlling optical switch 5. There are also provided a wavelength demultiplexer 7 on the input side of optical switch 5, and a wavelength converter 8 and a wavelength multiplexer 9 on the output side of optical switch 5.

In each plurality of input ports, optical wavelength multiplexed signal is demultiplexer into wavelength $\lambda 1$ to $\lambda n$, to space-switch in optical switch 5. The signal is then wavelength-converted in wavelength converter 8 and wavelength-multiplexed in wavelength multiplexer 9 to output.

In optical switch 5, a path is established by controller 6. In controller 6, there is provided a wavelength management table 60 for managing information related to a wavelength for performing a procedure for path establishment and path route modification, in addition to wavelengths for use in wavelength path forwarding.

In this wavelength management table 60, a state variable is applied to each combination of input wavelength and input port number, indicating one of the three states of 'not reserved', 'reserved' and 'double reserved'.

Figures 20, 21:
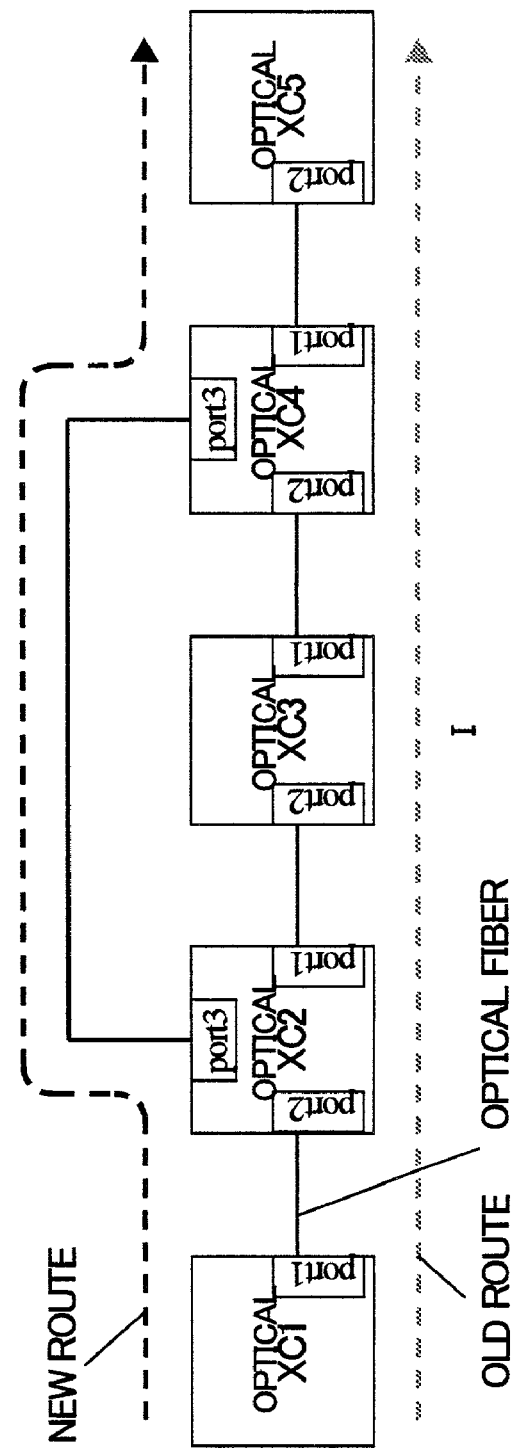
FIG. 20 shows an example of the contents of a wavelength management table in the configuration example using the optical cross-connect shown in FIG. 19.
FIG. 21 shows a network configuration example using the optical cross-connect shown in FIG. 19.

In FIG. 20, an example of wavelength management table 60 is shown, in which an indicator 'X' denotes 'not reserved', '○' denotes 'reserved', and '⊙' denotes 'double reserved'.

Now, hereafter there is explained the route modification on optical cross-connect shown in FIG. 19 for use in the optical network. The network is constituted by five (5) optical cross-connects (OXC) as shown in FIG. 19. Using optical transmission media or the like, physical connections are made between OXC1 and OXC2, OXC2 and OXC3, OXC3 and OXC4, OXC4 and OXC5, and also between OXC2 and OXC4.

It is assumed in such a network that there has been established a wavelength path constituting route I being originated from OXC1 and terminated by OXC5, in order of OXC1–OXC2–OXC3–OXC4–OXC5. The contents of wavelength management table 3 at that time are as shown in FIGS. 22A to 22E.

Now hereafter a case is explained that, in these optical cross-connects, the route is to be modified from aforementioned route I to a route II passing through OXC1 –OXC2–OXC4–OXC5. As a first step, as shown in FIG. 23, a wavelength request message is forwarded to the optical cross-connects along new route II from OXC located at the entry point of route I.

Namely, OXC1 located at the entry of the wavelength path forwards a message requesting a wavelength for route II to the next OXC2 located downstream along new route II. This message requesting a wavelength includes route information which indicates new route II, and a path identifier which indicates the wavelength path to be modified.

On receipt of this wavelength request message, OXC2 recognizes from the received path identifier that old route I corresponding to this path has the identical input port to that receiving the message. Therefore OXC2 reserves the wavelength $\lambda 21$ again which is the identical value of the input wavelength for old route I (as shown with ⊙ in FIG. 23B).

The notification of the reserved wavelength value of $\lambda 21$ to OXC1 is deferred until an output wavelength for new route II is reported from the downstream side. Also, OXC2 recognizes from the received route information that new route II will pass through port 3 to OXC4. OXC2 then forwards a message requesting a wavelength to OXC4 so as to obtain an output wavelength for new route II.

On receipt of this message, OXC4 recognizes from the received path identifier that the path for the old route I uses a different port from the port on which the message was received. OXC4 therefore reserves a new wavelength $\lambda 42$ for new route II. However, the notification of the reserved wavelength value of $\lambda 42$ to OXC2 is deferred until an output wavelength for new route II is reported from the downstream side.

Also, OXC4 recognizes from the received route information that new route II is to be extended to OXC5 through port 1. OXC4 then forwards a wavelength request message to OXC5 so as to obtain an output wavelength for new route II.

On receipt of this message, OXC5 recognizes from the received path identifier that the path for old route I uses the identical input port on which the message was received. Therefore OXC5 reserves the wavelength $\lambda 51$ again which is the identical value of the input wavelength for old route I.

Now route II is fixed and the procedure proceeds to the second step shown in FIG. 24. In the second step, OXC5 located at the exit point transmits to OXC4 being located upstream a wavelength notification message indicating wavelength $\lambda 51$ has been reserved for new route II.

This wavelength notification message includes a path identifier and a wavelength value for notification. On receipt of this message, OXC4 stores the wavelength value λ51 into a table entry corresponding to the path identifier of new route II in wavelength management table 60. Thus entire contents of wavelength management table 60 become to have effective values, and the contents are reflected to the optical switch.

Also, OXC4 notifies OXC2 of the wavelength value having been reserved for new route II. OXC2 then performs the similar processing as OXC4. OXC1 stores the received wavelength value into management table 60 and replaces input information to reflect to the optical switch. The procedure then proceeds to the third step shown in FIG. 25.

In the third step, as shown in FIG. 25, first OXC1 located at the entry of the wavelength path forwards a wavelength release message along old route I to next OXC2 being located downstream, requesting OXC2 to release the wavelength for old route I (procedure P9).

This release request message includes the path identifier and path information related to old route I. On receipt of this message, OXC2 recognizes from the received path identifier that to release wavelength λ21 is requested. Accordingly OXC2 releases wavelength λ21 and modifies the condition from 'double reserved' to 'reserved' (procedure P10).

Also, OXC2 deletes the output wavelength information related to old route I and forwards a wavelength release request to OXC3. OXC3 then determines from the path identifier the request is to release wavelength λ31. OXC3 then modifies the condition of wavelength λ31 to 'not reserved' state and deletes the output wavelength information. OXC3 also forwards a message to OXC4 requesting to release wavelength λ41.

OXC4 determines from the path identifier and the route information that the request is to release wavelength λ41. OXC4 then modifies the condition of wavelength λ41 to 'not reserved' state and deletes the output wavelength information (procedure P11). Further, OXC4 forwards a wavelength release message to OXC5.

OXC5 determines from the path identifier that the request is to release wavelength λ51, and modifies the condition of wavelength λ51 from 'double reserved' state to 'reserved' state. As a result of these procedures, new route II is established and old route I is released.

Next, another embodiment of the present invention is explained hereafter. It is assumed that a network configuration, a route on the optical cross-connects having been set previously, and a new route are identical to these in the above-mentioned embodiment.

Also, the contents of wavelength management table 60 before route modification is performed is assumed as shown in FIGS. 26A to 26E.

Compared to the embodiment shown in FIG. 22, only one point that a release priority is newly added is different. A situation in the first step is shown in FIG. 27. As described above, the contents of wavelength management table are the same as those shown in FIG. 22 except that release priority is added in FIG. 26. The release priority values are not varied here.

A situation in the second step is shown in FIG. 28. When wavelength information for new route II is received from the downstream side, the release priority of the wavelength for old route I is changed to a higher value than the release priority of the wavelength for new route II. Other procedure is identical to that of the former embodiment.

A situation in the third step is shown in FIG. 29. In the third step, first, OXC1 located at the entry point forwards a wavelength release message to the next OXC2 located downstream along old route I, requesting to release the wavelength corresponding to old route I (procedure P9).

The wavelength release message includes a path identifier. On receipt of this message, OXC2 recognizes, from the path identifier and the release priority, that a wavelength release message is further to be forwarded to OXC3.

Also, OXC2 recognizes from the path identifier that the request is to release wavelength λ21. OXC2 thus releases wavelength λ21 and then changes the condition of wavelength λ21 from 'double reserved' to 'reserved'. Further, determining from the release priority, OXC2 deletes output wavelength information for old route I, and then forwards a wavelength release message to OXC3 requesting to release the wavelength for old route I (procedure P10).

OXC3 determines the request is to release wavelength λ31 because there is only one entry corresponding to path identifier '1'. OXC3 also determines that a release request message is to be forwarded to OXC4. OXC3 changes the condition of wavelength λ31 to 'not reserved' and deletes the output wavelength information. OXC3 also forwards a wavelength release message to OXC4 (procedure P11).

OXC4 determines from the path identifier and the release priority that the request is to release wavelength λ41, and that a release request message is to be forwarded to OXC5. OXC4 then changes the condition of wavelength λ41 to 'not reserved' and deletes the output wavelength information. OXC4 also forwards a wavelength release message to OXC5 (procedure P12).

OXC5 then determines from the path identifier that the request is to release wavelength λ51, to changes the condition of wavelength λ51 from 'double reserved' to 'reserved' (procedure P13).

Through the above-mentioned procedures, new route II is established and old route I is released. The method and the system according to the present invention enables to prevent duplicated label setting in the route modification performed in the network.

The foregoing description of the embodiments is not intended to limit the invention to the particular details of the examples illustrated. For example, the above description is based on a network configuration constituted by five switching systems. However, the present invention is not limited to this configuration. Any suitable modification and equivalents may be resorted to the scope of the invention. All features and advantages of the invention which fall within the scope of the invention are covered by the appended claims.

What is claimed is:

1. In a network constituted by a plurality of packet switching systems connected through transmission lines, a route modification method for modifying a label switching pat from an old route to a new route, comprising the steps of:
    including in a label request for a new route an identifier indicating an old route having a sharable label;
    forwarding the label request from a packet switching system located on upstream side to a packet switching system located on downstream side along the new route;
    in the packet switching system located on the downstream side, setting the label for the old route to a double reserved state in case the new route being requested in the label request overlaps with the old route, or reserving a new label in case the new route does not overlap with the old route;

notifying the packet switching system located upstream from the packet switching system located downstream about the each reserved label;

forwarding a label release request explicitly specifying the old route to the packet switching system located on downstream side along the old route; and in the packet switching system, when receiving the label release request, either setting the double reserved label ;o a reserved state being reserved only for the new route in case the new route overlaps with the old route, or releasing the label for old route in case the new route does not overlap with the old route.

2. In a network constituted by a plurality of packet switching systems connected through transmission lines, a route modification method for modifying a label switching path from an old route to a new route, comprising the steps of:

including in a label request for a new route an identifier indicating an old route having a sharable label;

forwarding the label request from packet switching system located on upstream side to packer switching system located on downstream side along the new route;

in the packet switching system located on downstream side, setting the label for the old route to a double reserved start in case the new route being requested in the label request overlaps with the old route, or reserving a new label in case the new route does not overlap with the old route;

notifying packet switching system located upstream from packet switching system located downstream about the each reserved label;

in the packet switching system located on upstream side, when receiving the reserved label setting for an old label a release priority higher than a release priority for a new label;

forwarding a label release request to packet switching system located on downstream side along the old route; and in packet switching system, when receiving the label release request, either setting the double reserved label to a reserved state being reserved only for the new route in case the new route overlaps with the old route, or releasing the label for old route having the higher release priority in case the new route does not overlap with the old route.

3. In a network constituted by a plurality of optical cross-connect systems connected through transmission lines, a route modification method for modifying a wavelength path from an old route to a new route comprising the steps of:

including in a wavelength request for a new route, an identifier indicating an old route having a sharable wavelength;

forwarding the wavelength request from an optical cross-connect system located on upstream side to an optical cross-connect system located on downstream side along the new route;

in the optical cross-connect system located on downstream side, setting the wavelength for the old route to a double reserved state in case the new route being requested in the wavelength request overlaps with the old route, or reserving a new wavelength in case the new route does not overlap with the old route;

notifying the optical cross-connect system located upstream from the optical cross-connect system located downstream about the each reserved wavelength;

forwarding a wavelength release request explicitly specifying the old route to the optical cross-connect system located on downstream side along the old route; and in the optical cross-connect system, when receiving the wavelength release request, either setting the double reserved wavelength to a reserved state being reserved only for the new route in case the new route overlaps with the old route, or releasing the wavelength for old route in case the new route does not overlap with the old route.

4. In a network constituted by a plurality of optical cross-connect systems connected through transmission lines, a route modification method for modifying a wavelength path from an old route to a new route comprising the steps of:

including in a wavelength request for a new route an identifier indicating an old route having a sharable wavelength;

forwarding the wavelength request from an optical cross-connect system located on upstream side to an optical cross-connect system located on downstream side along the new route;

in the optical cross-connect located on downstream side, setting the wavelength for the old route to a double reserved state in case the new route being requested in the wavelength request overlaps with the old route, or reserving a new wavelength in case the new route does not overlap with the old route;

notifying the optical cross-connect system located upstream from the optical cross-connect system located downstream about the each reserved wavelength;

in the optical cross-connect located on upstream side, when receiving the reserved wavelength, setting for an old wavelength a release priority higher than a release priority for a new wavelength;

forwarding a wavelength release request to the optical cross-connect system located on downstream side along the old route; and in the optical cross-connect system, when receiving the wavelength release request, either setting the double reserved wavelength to a reserved state being reserved only for the new route in case the new route overlaps with the old route, or releasing the wavelength for old route having the higher release priority in case the new route does not overlap with the old route.

* * * * *